April 5, 1927.
A. M. BACON
1,623,377
TIRE CARRIER
Filed Sept. 24. 1924
3 Sheets-Sheet 1
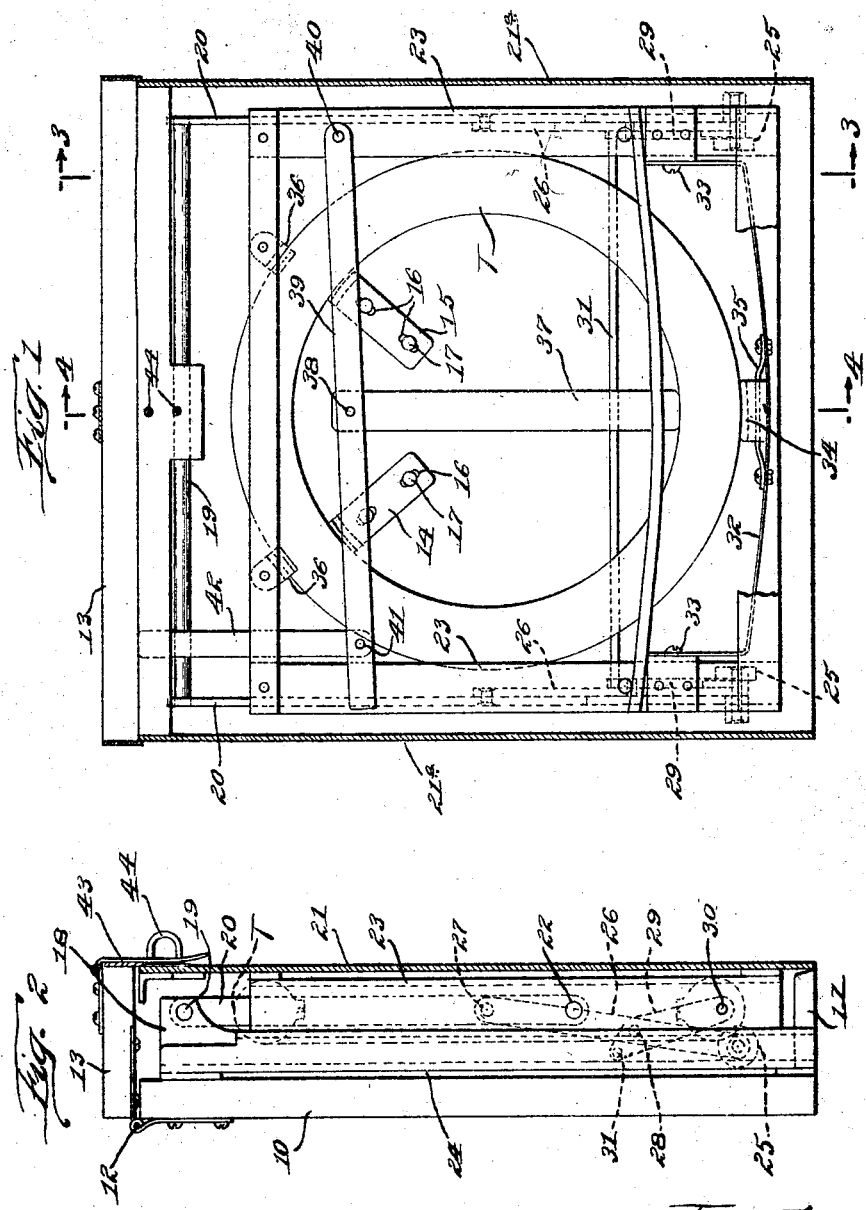
Inventor:
Alfred M. Bacon
By Henry C. Thomas
Atty.

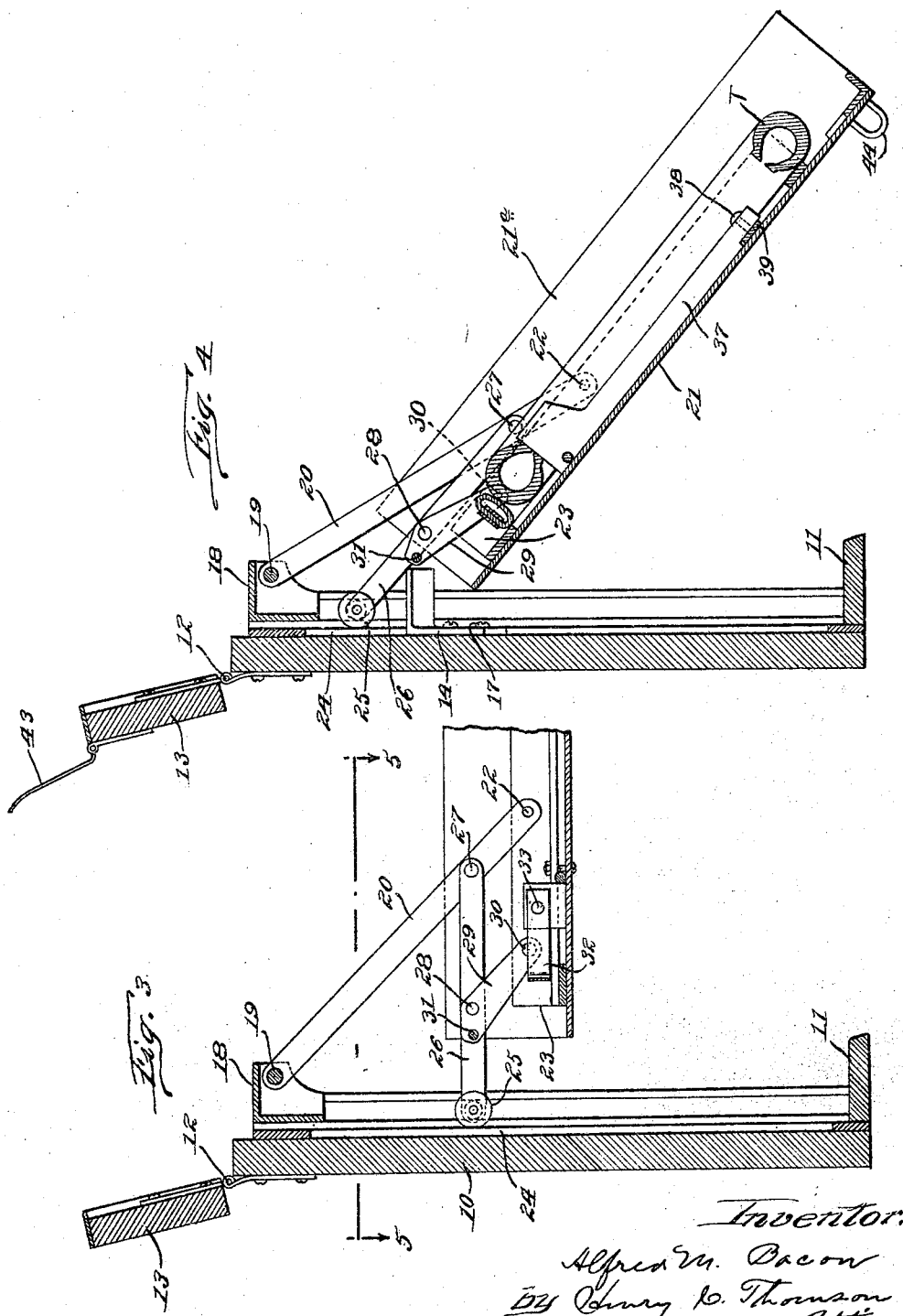

April 5, 1927.  A. M. BACON  1,623,377
TIRE CARRIER
Filed Sept. 24, 1924  3 Sheets-Sheet 3
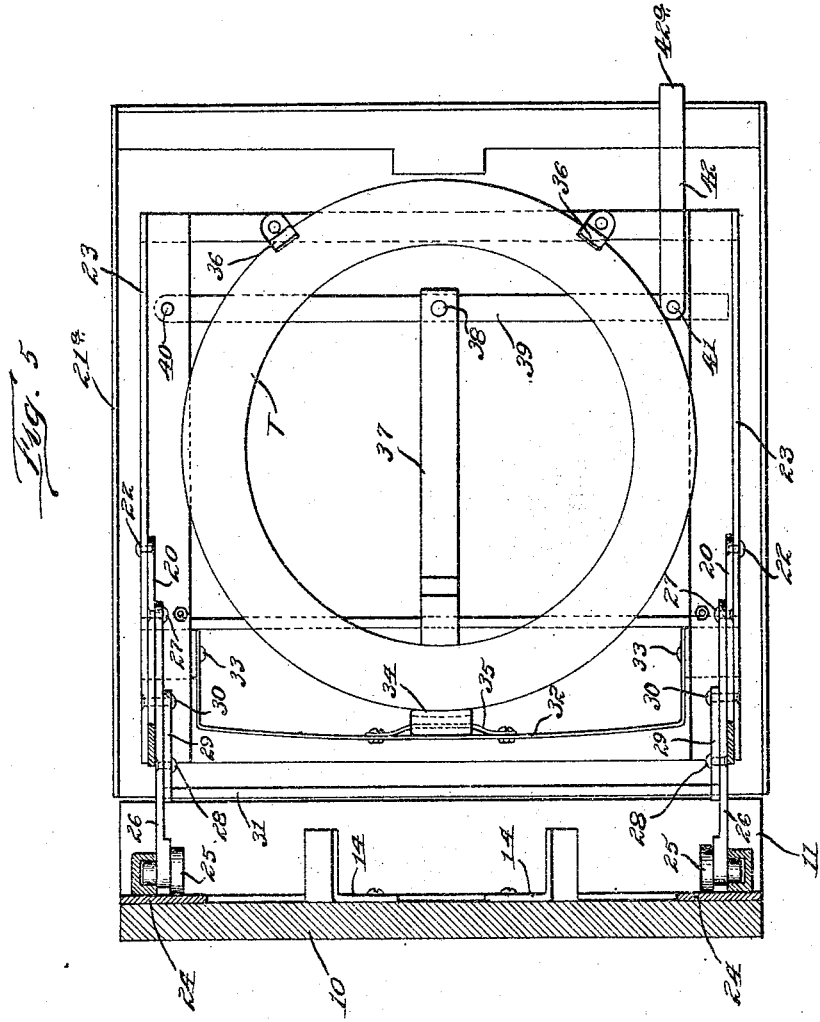
Inventor:
Alfred M. Bacon
By Henry C. Thomson
Atty.

Patented Apr. 5, 1927.

1,623,377

UNITED STATES PATENT OFFICE.

ALFRED M. BACON, OF ARLINGTON, MASSACHUSETTS.

TIRE CARRIER.

Application filed September 24, 1924. Serial No. 739,741.

This invention relates to tire carriers adapted for the protective carrying of spare tires on automobiles. One principal object of the invention is to provide a carrier that is simply and easily operated to open the same and permit instant removal of the tire without requiring the removal of any wrapping, covering or adjustable member or section.
A further object is to provide a carrying case for tires that is adapted to be instantly opened, and that in the opening operation automatically takes the tire from its supports and presents it ready for removal for use.

A still further object is to provide a tire carrier that is adapted to hold the tire on supports engaging the metal rim, but that on opening, removes the tire from such supports and holds it in grippers that permit convenient removal thereof, such grippers being disengaged from the tire when the tire is held in the closed casing.

Tire carriers or cases heretofore proposed, and not consisting of a flexible fabric or "slip" covering, either expose the hub of the wheel, or provide a core over which the center of the wheel slides, or afford a sheet covering which is completed by means of a top piece, flap, or removable section appearing on the outward face of the carrier, and only by removal of which can the wheel or tire within be withdrawn, or a tire be placed inside the case. In such types, because of the inherent conditions of their construction, such tire carriers or cases cannot be made weather-proof, and the tire is subject to deterioration due to contact with moisture and free dirt which works its way in, through flap-openings, cracks and interstices where joints or closings are not tight.

As is well known, alternation of wet and dry conditions is injurious to the tire fabric, especially when the tire is not in use. The present tire carrier by completely enclosing the tire in a continuous covering effectually isolates the tire from dirt or moisture. The tire is thus provided with dry storage, free from light.
A still further object is to provide a tire carrier that by its design, blends with the stream-line construction of the automobile, rendering the tire carrier inconspicuous, and in appearance, in unified association with the automobile.

The foregoing and other objects and advantages of the invention will more fully appear from the following detailed description taken in connection with the accompanying drawings, and the distinctive features of novelty will be pointed out in the appended claims.

Referring to the drawings—

Figure 1 is a front elevation of the tire holder closed, with the tire encased therein, and with the front housing broken away in section;

Fig. 2 is an end view of the tire holder closed, and also showing the housing broken away;

Fig. 3 is a transverse sectional view showing the device partly open, and with a portion broken away, the same being taken on line 3—3 of Fig. 1;

Fig. 4 is a transverse section on line 4—4 of Fig. 1, but showing the device fully opened; and Fig. 5 is a section on line 5—5 of Fig. 3.

The device comprises a backing plate or slab member 10, preferably square and of a dimension adapted to the size of the tire shoe to be held. This back member has fixed thereto a bottom plate 11 and it has also hinged thereto at 12 a cover 13. This backing plate has adjustably fixed thereto spaced apart supporting brackets 14, 15 upon which the tire T is adapted to rest when the device is closed, these brackets being adjustable radially with respect to the tire by having elongated slots 16 through which pass clamping bolts 17 which secure them to the backing plate. The backing plate 10 is provided with a forwardly extending bracket 18 adjacent its top, this bracket bearing a rod 19 at the ends of which are pivoted links 20.  21 indicates a front housing plate member equipped also with side flanges 21ª which, when the device is closed, fit upon the sides of the backing plate to complete the casing closure. The outer ends of the links 20 are pivoted at 22 to angular bars 23 fixed to the front plate 21 at a point intermediate the height of said plate, but relatively nearer the bottom thereof when the front plate is in closed position. The backing plate 10 is provided with track straps 24 extending vertically at its sides, and these are engaged by rollers 25 borne at one end of links 26, the other ends of which are pivoted at 27 to the links 20 relatively near the pivots 22, but spaced a distance therefrom. The links 26 have pivoted thereto intermediate their ends at 28, short links 29, the other ends of which are pivoted at 30 to the bars 23. Tail portions of these links 29 have fixed thereto the ends of a rod 31 which extends across the device and serves to steady and hold in relative alignment the described system of links at the two sides of the device.

It will be evident that the rod 31 may be dispensed with, but this would require that the pivot connections be fitted more exactly to keep the roller connections in place. This rod may be provided with reduced ends providing shoulders, and permitting such reduced ends to be sprung into sockets provided therefor in the links 29 by the elasticity of the rod. It will be noted that the tail portions of the links 29 which bear the rod 31, are laterally offset with respect to the plane of the pivots 28, 30; the object of this is to avoid contact of the rod 31 with the tire when the case is closed, as seen in Fig. 2.

By the described system of links, it will be noted from a consideration of Figs. 3 and 4 that the front plate member 21 bearing the tire may be swung outward free of the backing plate 10, and diagonally downward so as to present the tire T for convenient removal. 32 indicates a spring strap, the ends of which are secured, as indicated at 33, to lugs borne by the front plate 21. This spring strap is equipped with a resilient block 34 intermediate its length which may be of rubber, held in place by a strap 35 passing therethrough, and secured to the spring strap 32. 36, 36 indicate spaced apart grippers fixed to the front plate 21 at spaced apart points adjacent the top thereof and in position so that the resilient block 34 borne by the spring strap 32 tends to press the tire upward into engagement with such grippers. 37 indicates a presser foot adapted to engage the inner side of the tire at its bottom, i. e., opposite the block 34, so that when this presser foot is pressed down, the tire is freed from engagement with the grippers 36, and rests upon the supports 14, 15. The upper end of this presser foot is pivotally connected at 38 to an intermediate portion of a lever 39 which is fulcrumed at 40 to one of the angle bars 23. The other end of this lever has pivoted thereto at 41 a push-bar 42 which extends upward and presents its upper extremity 42ª extending normally a small distance above the top of the front plate 21, and in position so as to be engaged by the cover 13 when it is locked down, to press said bar 42 downward and thus cause the presser foot 37 to engage and press the tire downward away from engagement with the grippers 36, as described. This downward pressure upon the presser foot 37 may also be produced in other ways, if desired; such as by a screw or like operating means, instead of by closing the cover. The cover 13 is equipped with a pivoted hasp 43 slotted to fit over a staple 44 borne by the front plate 21. By the application of an ordinary lock to this staple, the carrier is securely locked closed, thus protecting the tire against theft.

In use, with the carrier closed, as seen in Fig. 2, the tire is completely protected against dirt, moisture and light, the front plate 21 with its side flanges 21ª interfitting closely with the back 10 and bottom 11, while the cover 13 fits down closely upon the front and back portions of the carrier. When thus closed, the presser foot 37 through the described connections including the push-bar 42, engaging the rim at the bottom, presses the tire down so that it rests upon the supports 14, 15 borne by the back plate 10.

It will be noted that when the case is opened, the described link motion lifts the tire from its supports, and that such lifting motion continues until that part of the tire that was in contact with the supports, is about half way to the position shown in Fig. 3.

Upon opening the cover 13, the presser foot 37 is released so that the spring strap 32 acts to press the tire upward releasing it from the supports 14, 15 and pressing it against the grippers 36. Then by merely pulling outward and downward upon the top portion of the front plate 21 it is first swung outward clear of the back, as seen in Fig. 3, and then partially inverted and turned diagonally downward as indicated in Fig. 4, thus exposing the tire for most convenient removal and replacement.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having described my invention, what I claim as new and desire to secure by Letters Patent is:

1. A tire carrier comprising a casing with front and back portions, the back portion bearing supports for the tire, and the front portion mounted for opening movement with respect to the back portion and bearing means for taking the tire off said supports and presenting it for removal.

2. A tire carrier comprising a back portion adapted to be secured to an automobile, a front portion interfitting therewith and connected thereto by a system of links arranged to permit the same to swing outward clear of the back portion and then to a partially inverted position, said back portion equipped with supports to engage the upper portion of the rim, and said front portion bearing grippers and means associated therewith for removing the tire from said supports as the front portion is swung to open position.

3. A tire carrier comprising a back portion adapted to be secured to the machine and equipped with tire supports, a front portion mounted for opening movement with respect to said back portion, a cover hinged to said back portion, grippers borne by the front portion for engaging the tire to move it off said supports when the carrier is opened, and means for disengaging said grippers from the tire when said cover is closed.

4. A tire carrier comprising a back portion, a front portion movably connected thereto for opening movement, a movable cover, and a presser foot borne by the front portion with connections to press it against the rim by the closing of said cover.

5. A tire carrier or the like, comprising a back portion presenting trackways, a front portion having links pivoted thereto at an intermediate point, with the other end of said links pivoted to the top of the back portion, other links pivoted at one end to the first named links intermediate the length thereof and bearing rollers at their other ends to engage said trackways, and still other links pivoted at one end to the last named links intermediate the length thereof and pivoted at their other ends to said front portion in approximate parallelism with the first named links.

6. A tire carrier or the like, comprising a back portion presenting a trackway, and a front portion having ends of two elements of a parallel system of links pivoted thereto at spaced apart points, one of said links having an extension thereof pivoted to said back portion, and another link of said system having an extension thereof equipped with a roller adapted to engage said trackway.

7. A tire carrier or the like, comprising a back portion equipped with vertically extending spaced apart trackways, a front portion, links pivoted at one end thereof to the top of said back portion and at their other ends to an intermediate point on said front portion, other links pivoted at an intermediate point to said first named links, but relatively near the connection thereof to the front portion and bearing rollers at their other ends to engage said trackways, and still other links pivotally connected with the front portion and with the last named links respectively so as to lie approximately in parallelism with the first named links, and to hold said roller-bearing links in approximate parallelism with said front portion.

8. A tire carrier or the like, comprising a back portion presenting trackways spaced apart at the sides thereof, a front portion, and two parallel systems of links co-operative respectively with said trackways, each system having ends of two elements thereof pivoted to said front portion at spaced apart points, one of said links having an extension thereof pivoted to said back portion, another link of each of said systems having an extension thereof equipped with a roller adapted to engage one of said trackways, and a spacing rod having its ends engaged with said link systems respectively, and relatively offset, so as to clear the tire held therein when said carrier is closed.

9. A tire carrier or the like, comprising a back portion presenting trackways spaced apart at the sides thereof, a front portion, and two parallel systems of links co-operative respectively with said trackways, each system having ends of two elements thereof pivoted to said front portion at spaced apart points, one of said links having an extension thereof pivoted to said back portion, another link of each of said systems having an extension thereof equipped with a roller adapted to engage one of said trackways, and a spacing rod having reduced ends engaged in sockets provided therefor in said two systems of links respectively, to hold them in properly spaced relation.

10. A tire carrier comprising a back housing portion, a front housing portion movably connected thereto for opening movement, a movable cover, said back and front portions and cover constructed to constitute a completely protective tire carrying case, and a presser foot borne by the front portion equipped with connections and operating means to press it against the tire rim at will.

In testimony whereof I affix my signature.

ALFRED M. BACON.